(12) United States Patent
Goldstein et al.

(10) Patent No.: US 9,141,257 B1
(45) Date of Patent: Sep. 22, 2015

(54) SELECTING AND CONVEYING SUPPLEMENTAL CONTENT

(75) Inventors: Douglas S. Goldstein, New York, NY (US); Ajay Arora, New York, NY (US); Douglas C. Hwang, New York, NY (US); Guy A. Story, Jr., New York, NY (US); Shirley C. Yang, New York, NY (US)

(73) Assignee: Audible, Inc., Newark, NJ (US)

( * ) Notice: Subject to any disclaimer, the term of this patent is extended or adjusted under 35 U.S.C. 154(b) by 482 days.

(21) Appl. No.: 13/526,330

(22) Filed: Jun. 18, 2012

(51) Int. Cl.
*G06F 17/00* (2006.01)
*G06F 3/0481* (2013.01)

(52) U.S. Cl.
CPC .................................. *G06F 3/0481* (2013.01)

(58) Field of Classification Search
CPC ... G09G 2380/14; G06F 3/167; G06F 3/0483; G06F 3/0481; G06F 15/0291; G06F 17/211; G06F 17/241; G06Q 30/02
See application file for complete search history.

(56) References Cited

U.S. PATENT DOCUMENTS

| | | | |
|---|---|---|---|
| 5,203,705 A | 4/1993 | Hardy et al. | |
| 5,351,189 A | 9/1994 | Doi et al. | |
| 5,533,757 A | 7/1996 | Morris | |
| 5,657,426 A | 8/1997 | Waters et al. | |
| 5,737,489 A | 4/1998 | Chou et al. | |
| 5,978,754 A | 11/1999 | Kumano | |
| 6,208,956 B1 | 3/2001 | Motoyama | |
| 6,260,011 B1 | 7/2001 | Heckerman et al. | |
| 6,356,922 B1 | 3/2002 | Schilit et al. | |
| 6,766,294 B2 | 7/2004 | MacGinite et al. | |
| 6,912,505 B2 | 6/2005 | Linden et al. | |
| 7,003,515 B1 | 2/2006 | Glaser et al. | |
| 7,107,533 B2 | 9/2006 | Duncan et al. | |
| 7,231,351 B1 | 6/2007 | Griggs | |
| 8,106,285 B2 | 1/2012 | Gerl et al. | |
| 8,109,765 B2 | 2/2012 | Beattie et al. | |
| 8,131,545 B1 | 3/2012 | Moreno et al. | |
| 8,131,865 B2 | 3/2012 | Rebaud et al. | |
| 8,434,685 B1 * | 5/2013 | Lewbel et al. | ................ 235/454 |
| 8,442,423 B1 | 5/2013 | Ryan et al. | |
| 8,548,618 B1 | 10/2013 | Story, Jr. et al. | |

(Continued)

FOREIGN PATENT DOCUMENTS

CN 103988193 A 8/2014
EP 2689346 1/2014

(Continued)

OTHER PUBLICATIONS

International Search Report and Written Opinion re Application No. PCT/US13/46009 mailed on Dec. 30, 2013.

(Continued)

*Primary Examiner* — Andrew C Flanders
(74) *Attorney, Agent, or Firm* — Knobbe, Martens, Olson & Bear, LLP

(57) ABSTRACT

Base items of content may be conveyed by a user computing device. These base items of content may be enhanced with enhancement content, such as sounds, songs, video clips, animations, images, multimedia content, and the like. Characteristics and enhancement objects may be identified in a portion of the base item of content, and enhancement content may be assigned to that portion automatically by a content enhancement service. In one embodiment, enhancement sounds or songs may be provided and conveyed to enhance an audiobook or electronic book.

30 Claims, 7 Drawing Sheets

(56) References Cited

U.S. PATENT DOCUMENTS

| | | |
|---|---|---|
| 8,577,668 B2 | 11/2013 | Rosart et al. |
| 8,855,797 B2 | 10/2014 | Story, Jr. et al. |
| 8,862,255 B2 | 10/2014 | Story, Jr. et al. |
| 8,948,892 B2 | 2/2015 | Story, Jr. et al. |
| 2002/0002459 A1 | 1/2002 | Lewis et al. |
| 2002/0007349 A1 | 1/2002 | Yuen |
| 2002/0041692 A1 | 4/2002 | Seto et al. |
| 2002/0116188 A1 | 8/2002 | Amir et al. |
| 2003/0061028 A1 | 3/2003 | Dey et al. |
| 2003/0083885 A1 | 5/2003 | Frimpong-Ansah |
| 2003/0115289 A1 | 6/2003 | Chinn et al. |
| 2004/0261093 A1 | 12/2004 | Rebaud et al. |
| 2006/0148569 A1 | 7/2006 | Beck |
| 2007/0016314 A1 | 1/2007 | Chan et al. |
| 2007/0061487 A1 | 3/2007 | Moore et al. |
| 2007/0136459 A1 | 6/2007 | Roche et al. |
| 2007/0276657 A1 | 11/2007 | Gournay et al. |
| 2008/0133529 A1 | 6/2008 | Berkowitz et al. |
| 2008/0168073 A1 | 7/2008 | Siegel et al. |
| 2008/0177822 A1 | 7/2008 | Yoneda |
| 2008/0294453 A1 | 11/2008 | Baird-Smith et al. |
| 2009/0047003 A1 | 2/2009 | Yamamoto |
| 2009/0136213 A1 | 5/2009 | Calisa et al. |
| 2009/0165140 A1* | 6/2009 | Robinson et al. .......... 726/26 |
| 2009/0210213 A1 | 8/2009 | Cannon et al. |
| 2009/0222520 A1 | 9/2009 | Sloo et al. |
| 2009/0228570 A1 | 9/2009 | Janik et al. |
| 2009/0233705 A1 | 9/2009 | Lemay et al. |
| 2009/0276215 A1 | 11/2009 | Hager |
| 2009/0305203 A1 | 12/2009 | Okumura et al. |
| 2009/0319273 A1 | 12/2009 | Mitsui et al. |
| 2010/0023485 A1 | 1/2010 | Cheng Chu |
| 2010/0042682 A1 | 2/2010 | Kaye |
| 2010/0042702 A1 | 2/2010 | Hanses |
| 2010/0064218 A1 | 3/2010 | Bull et al. |
| 2010/0070575 A1 | 3/2010 | Bergquist et al. |
| 2010/0225809 A1 | 9/2010 | Connors et al. |
| 2010/0279822 A1 | 11/2010 | Ford |
| 2010/0286979 A1 | 11/2010 | Zangvil et al. |
| 2010/0287256 A1 | 11/2010 | Neilio |
| 2011/0067082 A1 | 3/2011 | Walker |
| 2011/0087802 A1 | 4/2011 | Witriol et al. |
| 2011/0119572 A1 | 5/2011 | Jang et al. |
| 2011/0153330 A1 | 6/2011 | Yazdani et al. |
| 2011/0177481 A1 | 7/2011 | Haff et al. |
| 2011/0184738 A1 | 7/2011 | Kalisky et al. |
| 2011/0191105 A1 | 8/2011 | Spears |
| 2011/0195388 A1* | 8/2011 | Henshall et al. ........... 434/317 |
| 2011/0231474 A1 | 9/2011 | Locker et al. |
| 2011/0246175 A1 | 10/2011 | Yi et al. |
| 2011/0288861 A1 | 11/2011 | Kurzweil et al. |
| 2011/0288862 A1 | 11/2011 | Todic |
| 2011/0296287 A1 | 12/2011 | Shahraray et al. |
| 2012/0001923 A1 | 1/2012 | Weinzimmer et al. |
| 2012/0030288 A1 | 2/2012 | Burckart et al. |
| 2012/0092329 A1 | 4/2012 | Koo et al. |
| 2012/0109640 A1 | 5/2012 | Anisimovich et al. |
| 2012/0150935 A1 | 6/2012 | Frick et al. |
| 2012/0158706 A1 | 6/2012 | Story, Jr. et al. |
| 2012/0166180 A1 | 6/2012 | Au |
| 2012/0173659 A1* | 7/2012 | Thaxter et al. ........... 709/217 |
| 2012/0197998 A1 | 8/2012 | Kessel et al. |
| 2012/0204086 A1* | 8/2012 | Stoner et al. ........... 715/201 |
| 2012/0245720 A1 | 9/2012 | Story, Jr. et al. |
| 2012/0246343 A1 | 9/2012 | Story, Jr. et al. |
| 2012/0310642 A1 | 12/2012 | Cao et al. |
| 2012/0315009 A1 | 12/2012 | Evans et al. |
| 2012/0324324 A1 | 12/2012 | Hwang et al. |
| 2013/0041747 A1 | 2/2013 | Anderson et al. |
| 2013/0073449 A1 | 3/2013 | Voynow et al. |
| 2013/0073675 A1 | 3/2013 | Hwang et al. |
| 2013/0074133 A1 | 3/2013 | Hwang et al. |
| 2013/0080881 A1* | 3/2013 | Goodspeed et al. ........... 715/251 |
| 2013/0091429 A1 | 4/2013 | Weng et al. |
| 2013/0124988 A1* | 5/2013 | Lettau ........... 715/277 |
| 2013/0130216 A1 | 5/2013 | Morton et al. |
| 2013/0191708 A1* | 7/2013 | Song ........... 715/202 |
| 2013/0257871 A1 | 10/2013 | Goldstein et al. |
| 2014/0005814 A1 | 1/2014 | Hwang et al. |
| 2014/0039887 A1 | 1/2014 | Dzik et al. |
| 2014/0040713 A1 | 2/2014 | Dzik et al. |
| 2014/0223272 A1 | 8/2014 | Arora et al. |
| 2014/0250219 A1 | 9/2014 | Hwang |
| 2015/0026577 A1 | 1/2015 | Story et al. |

FOREIGN PATENT DOCUMENTS

| | | |
|---|---|---|
| JP | 2002-140085 | 5/2002 |
| JP | 2002-328949 | 11/2002 |
| JP | 2003-304511 | 10/2003 |
| JP | 2004-029324 | 1/2004 |
| JP | 2004-117618 | 4/2004 |
| JP | 2004-266576 | 9/2004 |
| JP | 2005-189454 A | 7/2005 |
| JP | 2007-522591 | 8/2007 |
| JP | 2007-249703 | 9/2007 |
| JP | 2010-250023 | 11/2010 |
| NZ | 532174 | 11/2012 |
| WO | WO 2006/029458 | 3/2006 |
| WO | WO 2011/144617 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Beattie, Valerie et al., "Reading Assistant: Technology for Guided Oral Reading", Scientific Learning, Apr. 10, 2012, 5 pages.

Levinson, S.E. et al., "Continuous Speech Recognition from a Phonetic Transcription", Acoustics, Speech, and Signal Processing, Apr. 1990, pp. 190-199.

Story Jr. et al., U.S. Appl. No. 12/881,021, filed Sep. 13, 2010, entitled "Systems and Methods for Associating Stories with Related Referents".

Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.

Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.

Fabio Vignoli et al., Aug. 7-10, 1999, A Text-Speech Synchronization Technique With Applications to Talking Heads, Auditory-Visual Speech Processing, ISCA Archive.

Yardena Arar, Jan. 7, 2010, Blio E-Book Platform: No Reader (Yet), But Great Graphics.

International Search Report re International Application No. PCT/US13/33935 mailed on Jul. 3, 2013.

International Search Report issued for PCT/US12/30198 mailed on Jun. 20, 2012, 16 pages.

U.S. Appl. No. 13/531,376, filed Jun. 22, 2012, entitled "Modelling Expected Errors for Discriminative Training."

U.S. Appl. No. 13/536,711, filed Jun. 28, 2012, entitled "Pacing Content."

U.S. Appl. No. 13/604,482, filed Sep. 5, 2012, entitled "Identifying Corresponding Regions of Content."

U.S. Appl. No. 13/604,486, filed Sep. 5, 2012, entitled "Selecting Content Portions for Alignment."

U.S. Appl. No. 13/662,306, filed Oct. 26, 2012, entitled "Content Presentation Analysis."

International Search Report issued in connection with International Patent Application No. PCTUS12/30186 mailed on Jun. 20, 2012, 12 pages.

(56) References Cited

OTHER PUBLICATIONS

Extended Search Report in European Application No. (12761404.8) dated Jan. 26, 2015.
Office Action in Japanese Application No. 2014-501254 dated Oct. 14, 2014.
International Preliminary Report on Patentability issued in connection with International Patent Application No. PCT/US12/30198 mailed on Jan. 30, 2014, 8 pages.
Office Action in Japanese Application No. 2014-501257 dated Aug. 25, 2014.
International Search Report and Written Opinion in PCT/US2013/042903 mailed Feb. 7, 2014.
International Preliminary Report on Patentability in PCT/US2013/042903 mailed Dec. 2, 2014.
International Search Report issued in connection with International Application No. PCT/US13/53020 mailed on Dec. 16, 2013.
International Preliminary Report issued in connection with International Application No. PCT/US13/53020 mailed on Feb. 12, 2015.
International Search Report and Written Opinion in PCT/US2014/014508 mailed Jun. 25, 2014.

* cited by examiner

SELECTING AND CONVEYING SUPPLEMENTAL CONTENT

BACKGROUND

Generally described, user computing devices may facilitate the playback or display of items of content, such as audiobooks, electronic books, songs, videos, television programs, computer and video games, multi-media content, and the like. For example, an e-reader user computing device may display an electronic book on a screen or play an audiobook through speakers or headphones. In some instances, the publisher or author of an item of content may provide supplemental content to accompany the item of content, such as a soundtrack, video clip, multi-media content, etc. This supplemental content may be played by the user computing device as the user consumes the item of content.

In some current approaches, this supplemental content is created specifically for an item of content. For example, a soundtrack for a particular electronic book or audiobook may be recorded and synchronized to that electronic book or audiobook. However, this approach can be time-consuming and expensive, possibly requiring the generation of new supplemental content for each item of content to be enhanced. This purpose-generated supplemental content may become "stale" for a user of the content, especially in cases where only a small amount of supplemental content is generated for the item of content. Moreover, if the user dislikes the supplemental content provided with an item of content, he or she may have no recourse other than to disable the supplemental content. Likewise, users that wish to customize the supplemental content may not have the opportunity to do so under these approaches.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
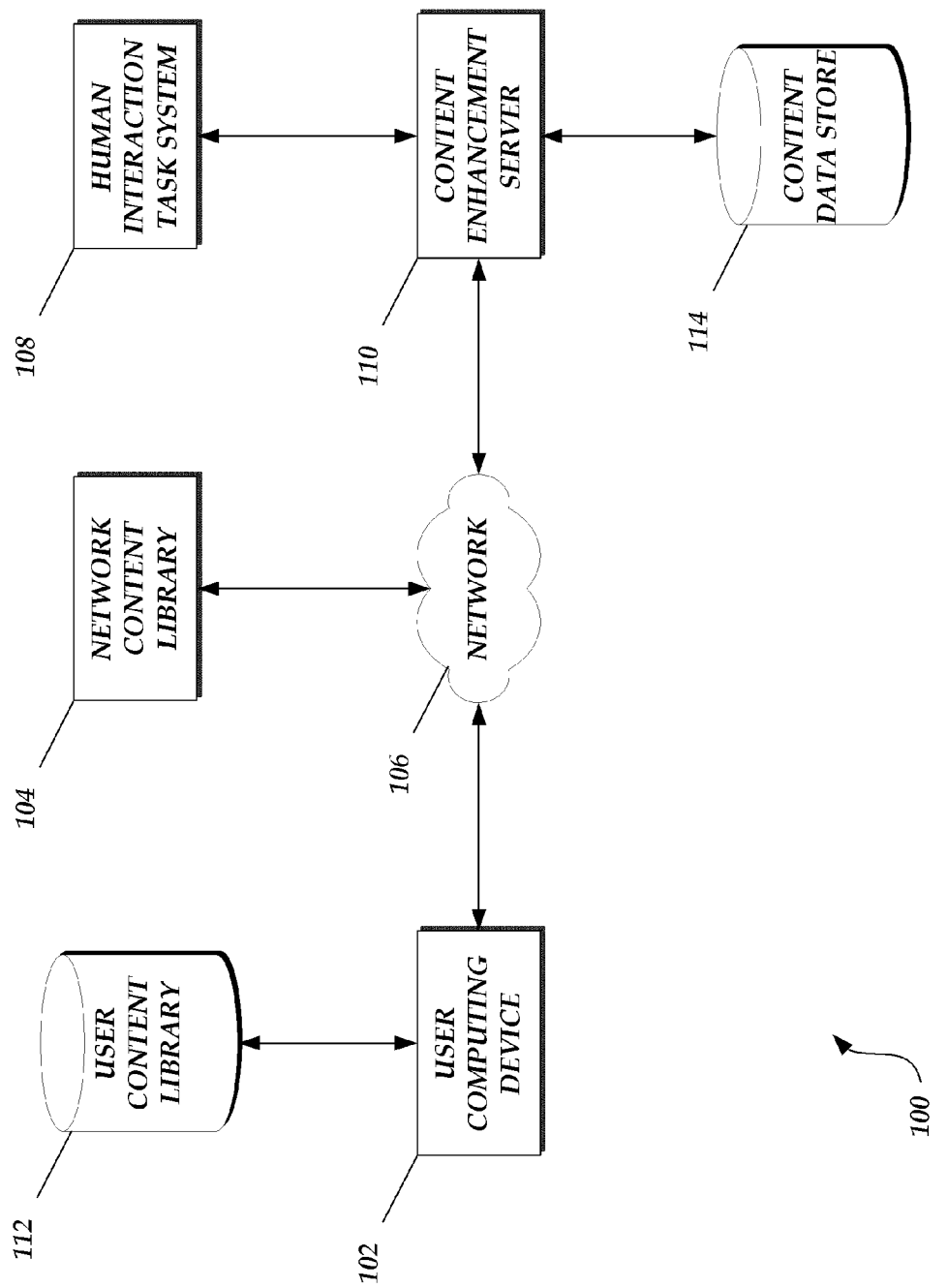
FIG. 1 is a schematic diagram of an illustrative network environment in which a content enhancement service may operate.

Generally described, aspects of the present disclosure relate to enhancing digital content. In this regard, a computer-implemented content enhancement service is disclosed. A base item of content, such as an audiobook, electronic book, song, video or computer game, television program, movie, multi-media clip, etc. may be enhanced with one or more items of audio, visual, or audiovisual enhancement content, such as sounds, songs, video clips, images, text, animations, computer or video mini-games, etc. selected by the content enhancement service and/or by a user. Accordingly, in some embodiments, a user computing device conveys enhancement content (e.g., by displaying visual enhancement on a screen of the user computing device and/or playing audio enhancement content over speakers or headphones connected to the user computing device) while conveying the base item of content for which the enhancement content was selected. The enhancement content may be created specifically to accompany a base item of content, or it may be pre-existing content that is unrelated to the base item of content.

The content enhancement service may analyze a portion of the base item of content to identify one or more characteristics of the portion of the base item of content. The content enhancement service may determine the characteristics of a portion of the base item of content by machine content analysis techniques, by human input, or by obtaining information about the portion from an external resource that maintains information about the base item of content. These characteristics may be used to guide the selection of enhancement content for the portion of the base item of content. Characteristics of a portion of a base item of content may include, for example, a genre of the base item of content; a mood of the portion of the base item of content; a geographical setting of the portion of the base item of content; a historical setting of the portion of the base item of content; and a time of day of the portion of the base item of content. For instance, for a portion of a base item of content set on a beach, the content enhancement service may select enhancement content such as sounds for waves crashing or seagulls squawking, or an image of a beach. In another example, for a portion of a base item of content set in a kitchen during the morning, the content enhancement service may select enhancement content such as the sound of a toaster popping or bacon sizzling. Characteristics of a base item of content may also be referred to herein as "labels."

The content enhancement service may also analyze the portion of the base item of content for enhancement objects (sometimes referred to herein simply as "objects") present in the portion of the base item of content. The presence of an enhancement object may suggest or signify a specific item of enhancement content, such as a specific sound, image, video clip, etc. to be conveyed. In some embodiments, an enhancement object includes at least one word, phrase, or sentence present in the portion of the base item of content. An enhancement object may also appear as an image on a page of an electronic book, or may be recited (e.g., spoken, sung, shouted, etc.) during an audiobook. In some embodiments, a specific type of enhancement content is identified or suggested by the enhancement object. An enhancement object may be a sound object, an image object, or another type of enhancement object, depending on which specific type or types of enhancement content may be called for by the enhancement object. For example, the word "cow" may be a sound object associated with a mooing sound, an image object associated with a picture of a cow, or both. Onomatopoeia may also be sound objects (e.g., "the wind howled").

In some embodiments, the characteristics of a portion of the base item may influence the selection of an item of enhancement content corresponding to an enhancement object present in the portion of the base item of content. For example, the sound object "birds" may be recited in a horror-themed audiobook. Accordingly, the sound of a bird that fits the horror theme, such as a raven's caw, may be selected as an item of enhancement content. In another example, the sound object "boombox" may appear in an electronic book set in the 1980s. Accordingly, a song popular on the radio in the 1980s may be selected as an item of enhancement content.

In some base items of content, no enhancement object is present. Rather, an item of enhancement content may be selected if its characteristics or labels are similar to a portion of the base item of content with which the item of enhancement content is to be conveyed. Characteristics of an item of enhancement content may also be referred to herein as "labels." In one example, a portion of the base item of content may be analyzed using natural language techniques or other content analysis techniques to determine an event or mood of the portion. For example, a portion of a base item of content may include the words "party" and "celebrate," indicating a cheerful mood. Enhancement content corresponding to the cheerful mood, such as a fast song in a major key, may be selected to accompany the cheerful portion. The characteristics of an item of enhancement content may be either pre-assigned by the content enhancement service, or characteristics may be determined by analyzing the item of enhancement content. For example, the content enhancement service may maintain one or more rules or graphs to determine the characteristics of an item of enhancement content. An example rule might be, "Fast songs in major keys have a cheerful characteristic."

Those skilled in the art will recognize that items of enhancement content need not be stored on the computing device that conveys the base item of content. For example, items of enhancement content may be streamed over a network to the conveying computing device (e.g., a user computing device) from external resources, such as a content enhancement server or a network content library remote from the conveying computing device. Items of enhancement content may also be relayed among multiple external resources before being transmitted to the conveying computing device. For example, a content enhancement server may request enhancement content from a network content library, obtain that enhancement content, and then transmit the obtained enhancement content to the conveying computing device.

The selections of which items of enhancement content accompany which portions of the base item of content may be made and/or changed dynamically by users or by the content enhancement service. These selections may be collected and stored as an enhancement content settings file or content pack for use with the base item of content. Enhancement content settings files or content packs may be transmitted over a network from a content enhancement server to a user computing device, or vice versa. A user computing device may also transmit an enhancement content settings file or content pack to another user computing device.

Turning to FIG. 1, an illustrative network environment 100 is shown. The network environment 100 may include a user computing device 102, a network content library 104, a network 106, a human interaction task system 108, a content enhancement server 110, a user content library 112, and a content data store 114. The constituents of the network environment 100 may be in communication with each other either locally or over the network 106.

The user computing device 102 may be any computing device capable of communicating over the network 106, such as a laptop or tablet computer, personal computer, personal digital assistant (PDA), hybrid PDA/mobile phone, mobile phone, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The user computing device 102 may generally be capable of conveying content to a user of the user computing device 102. For example, the user computing device 102 may be capable of playing audio content by directing audible output through speakers, headphones, or the like. The user computing device 102 may also be capable of displaying images or video content on a display screen. The user computing device 102 may also be capable of communicating over the network 106, for example, to request items of enhancement content from the network content library 104 or the content enhancement server 110.

The user computing device 102 may be in communication with a user content library 112. The user content library 112 may electronically store items of enhancement content, such as sounds, songs, video clips, images, animations, computer or video mini-games, etc. These items of enhancement content may have characteristics or labels associated with them. In some embodiments, items of enhancement content may be organized into groups (e.g., playlists or queues) that are designated by the user as having certain characteristics. For example, the user may have a "party" playlist. The content enhancement service may treat the items of enhancement content in the "party" playlist as having a "party" characteristic. The items of enhancement content in the playlist may be selected to be conveyed with a portion of a base item of content describing a party. The user content library 112 may additionally store one or more graphs or rules used to select items of enhancement content, as discussed below with respect to FIG. 3. In some embodiments, the user content library 112 also stores one or more base items of content. The user content library 112 may be embodied in hard disk drives, solid state memories, and/or any other type of non-transitory, computer-readable storage medium accessible to the user computing device 102. The user content library 112 may also be distributed or partitioned across multiple storage devices as is known in the art without departing from the spirit and scope of the present disclosure.

The network content library 104 may host or maintain items of enhancement content that may be accessed over the network 106 by a user computing device 102 or by the content enhancement server 110. The network content library may include one or more electronic data stores to host or maintain items of enhancement content, and may further store one or more graphs or rules used to select items of enhancement content, as discussed below with respect to FIG. 3. The network content library may be, for example, a network-based social content aggregator; a network-based content hosting community; a network-based content delivery platform; or a combination thereof. Upon request, the network content library 104 may transmit a requested item of enhancement content to the requesting computing device, such as the user computing device 102 or the content enhancement server 110. As with the user content library 112, the network content library 104 may organize items of enhancement content into groups such as playlists or queues. A label or characteristic applied to the group may also be applied to all items of enhancement content in the group, as discussed above.

The network 106 may be any wired network, wireless network, or combination thereof. In addition, the network 106 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

A human interaction task system 108 may be included in the network environment to assist the content enhancement server 110. Generally described, the human interaction task system 108 is a computerized system that electronically processes human interaction tasks (HITs). A HIT may be a difficult, time-consuming, or expensive task for a computing device to perform. However, it might be relatively easy and quick for a human to perform a HIT. Accordingly, the human interaction task system 108 might request a human worker to perform a HIT, e.g., for gathering information or answering a query, and to return the results or answers to the human interaction task system 108 for further processing and/or presentation to the requestor. Thus, in some embodiments, the content enhancement service directs the human interaction task system 108 to pose one or more queries about an item of content to a human worker of the human interaction task system 108. For example, a human worker may be asked to identify characteristics of a base item of content or of an enhancement item of content, to identify enhancement objects in the base item of content; or to suggest enhancement content for use with a base item of content. The human interaction task system 108 may receive answers to these queries and transmit them to the user computing device 102 or the content enhancement server 110 to guide the operation of the content enhancement service. The human worker of the human interaction task system 108 may volunteer to respond to these and other tasks and to communicate other information about the item of content to the content enhancement server 110.

The content enhancement server 110 is a computing device that may perform a variety of tasks to enhance base items of content. For example, the content enhancement server 110 may receive a request to enhance content from the user computing device 102 over the network 106, and, in response to the request, transmit items of enhancement content to the user computing device 102. Additional operations of the content enhancement server 110, such as aligning enhancement content to base items of content and analyzing characteristics of content, are described with respect to FIG. 2.

The content enhancement server 110 may be in communication with a content data store 114. Like the user content library 112, the content data store 114 may electronically store items of enhancement content, such as sounds, songs, video clips, images, animations, computer or video minigames, etc. In some embodiments, the content data store 114 also stores one or more base items of content. The content data store 114 may additionally store one or more graphs or rules used to select items of enhancement content, as discussed below with respect to FIG. 3. The content data store 114 may be embodied in hard disk drives, solid state memories, and/or any other type of non-transitory, computer-readable storage medium accessible to the content enhancement server 110. The content data store 114 may also be distributed or partitioned across multiple storage devices as is known in the art without departing from the spirit and scope of the present disclosure.

The user computing device 102 and content enhancement server 110 may each be embodied in a plurality of components, each executing an instance of the respective content user computing device 102 and content enhancement server 110. A server or other computing system implementing the user computing device 102 and content enhancement server 110 may include a network interface, memory, processing unit, and computer readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and content enhancement server 110. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the content enhancement server 110 may be represented in a single physical server or, alternatively, may be split into multiple physical servers. The entire content enhancement service may be represented in a single user computing device 102 as well. Additionally, it should be noted that in some embodiments, the content enhancement service may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 2:
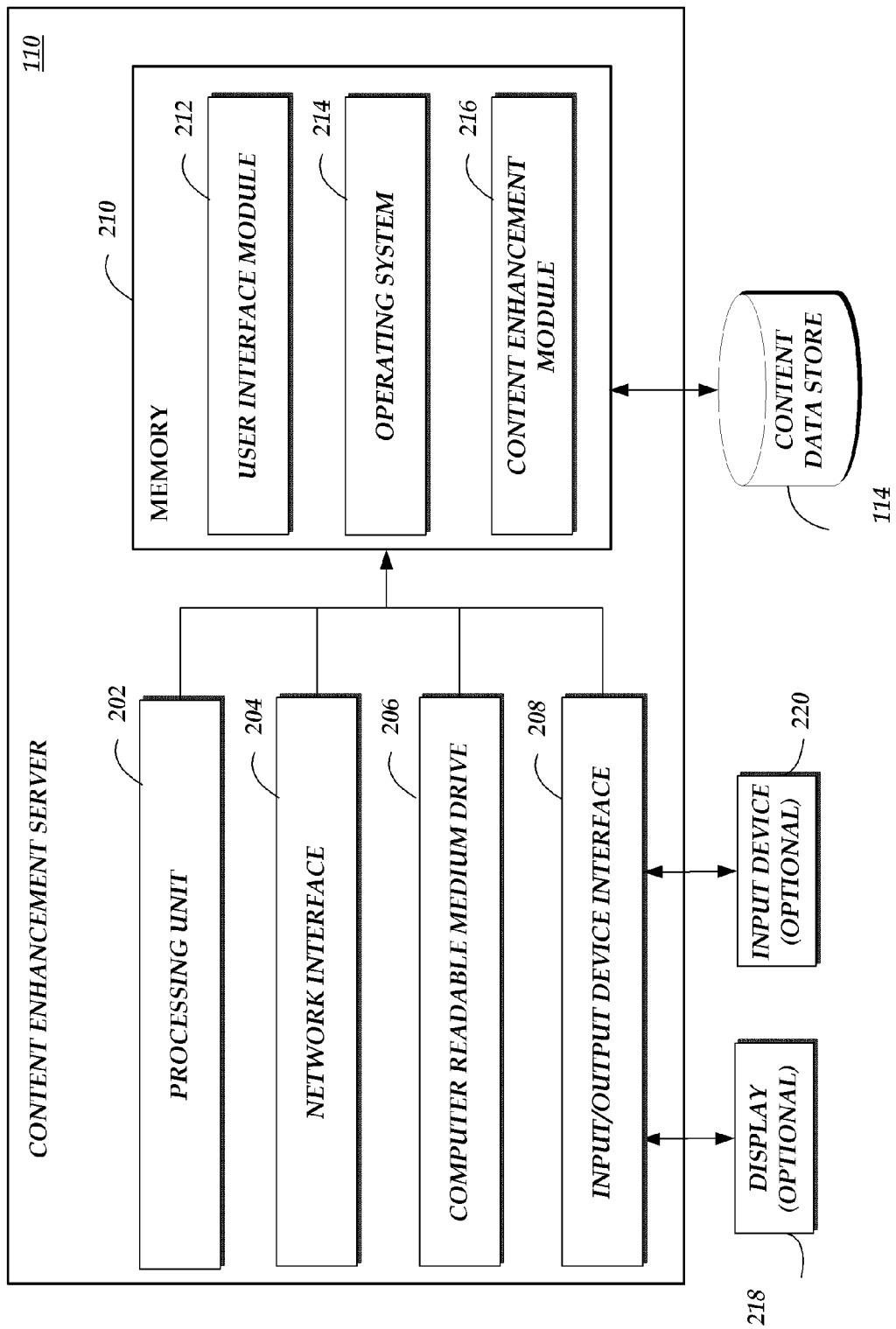
FIG. 2 is a schematic diagram of an illustrative content enhancement server.

FIG. 2 is a schematic diagram of the content enhancement server 110 shown in FIG. 1. The content enhancement server 110 includes an arrangement of computer hardware and software components that may be used to implement the content enhancement service. FIG. 2 depicts a general architecture of the content enhancement server 110 illustrated in FIG. 1. Those skilled in the art will appreciate that the content enhancement server 110 may include more (or fewer) components than those shown in FIG. 2. It is not necessary, however, that all of these generally conventional components be shown in order to provide an enabling disclosure.

The content enhancement server 110 includes a processing unit 202, a network interface 204, a non-transitory computer-readable medium drive 206, and an input/output device interface 208, all of which may communicate with one another by way of a communication bus. As illustrated, the content enhancement server 110 is optionally associated with, or in communication with, an optional display 218 and an optional input device 220. The display 218 and input device 220 may be used in embodiments in which users interact directly with the content enhancement server 110, such as an integrated in-store kiosk, for example. In other embodiments, the display 218 and input device 220 may be included in a user computing device 102 shown in FIG. 1. The network interface 204 may provide the content enhancement server 110 with connectivity to one or more networks or computing systems. The processing unit 202 may thus receive information and instructions from other computing systems (such as the user computing device 102) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 contains computer program instructions that the processing unit 202 executes in order to implement one or more embodiments of the content enhancement service. The memory 210 generally includes RAM, ROM, and/or other persistent or non-transitory computer-readable storage media. The memory 210 may store an operating system 214 that provides computer program instructions for use by the processing unit 202 in the general administration and operation of the content enhancement server 110. The memory 210 may further include other information for implementing aspects of the content enhancement service. For example, in one embodiment, the memory 210 includes a user interface module 212 that facilitates generation of user interfaces (such as by providing instructions therefor) for display upon a computing device such as user computing device 102. For example, a user interface may be displayed via a navigation interface such as a web browser installed on the user computing device 102. In addition, memory 210 may include or communicate with the content data store 114. Content stored in the content data store 114 may include base items of content and items of enhancement content in audio, visual, or multi-media formats, as described in FIG. 1.

In addition to the user interface module 212, the memory 210 may include a content enhancement module 216 that may be executed by the processing unit 202. In one embodiment, the content enhancement module 216 may be used to implement the content enhancement service. For example, the content enhancement module 216 may be used to select items of enhancement content and assign them to portions of a base item of content; to direct the content enhancement server 110 to obtain items of enhancement content from the network content library 104 and to store them in content data store 114; or to direct the content enhancement server 110 to transmit items of enhancement content to a user computing device 102 over a network 106, among other tasks.

Those skilled in the art will recognize that in some embodiments, the content enhancement service is implemented partially or entirely by the user computing device 102. Accordingly, the user computing device 102 may include a content enhancement module 216 and other components that operate similarly to the components illustrated as part of the content enhancement server 110, including a processing unit 202, network interface 204, non-transitory computer readable medium drive 206, input/output interface 208, memory 210, user interface module 212, and so forth.

Figure 3:
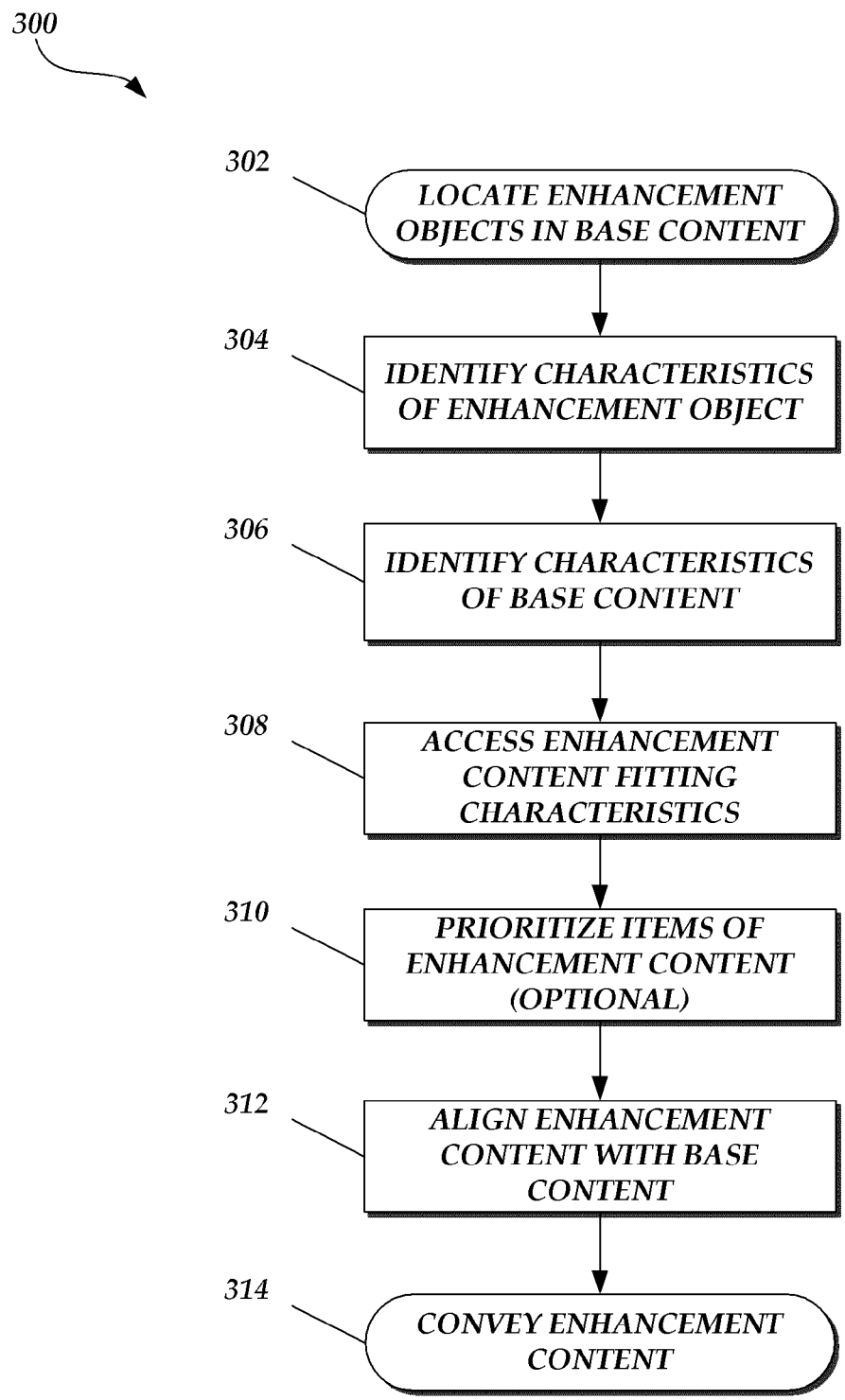
FIG. 3 is a flow diagram depicting an illustrative routine for selecting and conveying enhancement content.

FIG. 3 depicts an illustrative routine 300 which may be followed by the content enhancement service to assign one or more items of enhancement content to one or more portions of a base item of content. The routine 300 may be carried out in whole or in part by the user computing device 102, the content enhancement server 110, or both.

In block 302, the content enhancement service may locate enhancement objects present in a portion of the base item of content. An enhancement object may appear in textual or graphical form, or may be recited in an item of audio content. For example, Enhancement objects may also be identified in textual representations of items of content, such as transcripts of audiobooks, videos, television episodes, etc. Electronic books may also be a textual representation of an item of content. As discussed above, enhancement objects may appear in a portion of a base item of content and may suggest, specify, or signify an item of enhancement content to be conveyed while the portion of the base item of content is conveyed. Examples of enhancement objects may include words that correspond to sounds (such as onomatopoeia, or such as objects that generate sounds, like animals, cars, radios, etc.); images that correspond to sounds; words that correspond to images, video clips, or animations; and the like.

Enhancement objects may be located in the base item of content using a variety of techniques. In one embodiment, machine techniques known in the art may be used to identify enhancement objects. For example, the content enhancement service may employ natural language techniques, semantic analysis, named entity extraction, or other content analysis techniques. Further information on the use of machine techniques to locate objects in an item of content may be found in U.S. patent application Ser. No. 12/972,058, entitled "GRAPHICALLY REPRESENTING ASSOCIATIONS BETWEEN REFERENTS AND STORIES," filed on Dec. 17, 2010; and in U.S. patent application Ser. No. 12/881,021, entitled "SYSTEMS AND METHODS FOR ASSOCIATING STORIES WITH RELATED REFERENTS," filed on Sep. 13, 2010. The disclosures of both of these applications are hereby incorporated by reference in their entireties. In another embodiment, the content enhancement service may incorporate input from a human interaction task system 108 to locate enhancement objects in a base item of content. For example, the human interaction task system 108 may convey a portion of a base item of content (such as a passage of text in an electronic book or an excerpt of an audiobook) to a human worker of the human interaction task system 108, and ask the human worker to identify one or more enhancement objects in the portion of the base item of content. The human worker may also be asked to identify or provide enhancement content that may associated with the enhancement object. In still another embodiment, the content enhancement service may rely on a list of enhancement objects known to be present in the portion of the base item of content. This list may be generated by, for example, one or more experts associated with the content enhancement service or by user input. A list may be obtained from a network content library, network-based knowledge base, or network-based encyclopedia, among other examples.

In block 304, the content enhancement service may identify the characteristics of the enhancement objects identified in block 302. Characteristics of an enhancement object may include, for example, what type of enhancement content would be appropriate for the enhancement object (sound, song, video, image, etc.); how long the enhancement content should be conveyed; or other attributes of the enhancement content specified by the enhancement object (e.g., the volume of audio enhancement content; the genre of audio or video enhancement content; etc.). For example, the sentence, "The car honked for a full ten seconds," contains the onomatopoeia "honked," indicating that honked is a sound object, as well as information that suggests how long the car honked: "a full ten seconds." Having identified "honked" as an enhancement object, the content enhancement service may determine that the characteristics of the enhancement object "honked" include the fact that the word "honked" indicates a sound and that the duration of the sound should be ten seconds. In another example, the base item of content may include the sentence "Cameron gazed at the Pointillist painting." Having identified "painting" as an enhancement object, the content enhancement service may determine that the characteristics of the enhancement object "painting" include the fact the word "painting" indicates an image and that the image should be of a painting of the Pointillist style.

Characteristics of an enhancement object may be identified in a variety of ways. In one embodiment, machine techniques known in the art may be used to identify the characteristics of enhancement objects. For example, the content enhancement service may employ natural language techniques, semantic analysis, named entity extraction, or other content analysis techniques known in the art to determine the characteristics of an enhancement object, e.g., by analyzing any words, phrases, or sentences in the vicinity of the enhancement object. In another embodiment, the content enhancement service may incorporate input from a human interaction task system to identify the characteristics of an enhancement object. For example, the human interaction task system may convey a portion of a base item of content (such as a passage of text in an electronic book or an excerpt of an audiobook) to a human worker of the human interaction task system and indicate which enhancement objects are present. The human interaction task system may then ask the human worker to identify any characteristics of the enhancement object, such as what type of enhancement content is specified by the enhancement object, how long an item of video or audio enhancement content should last, etc. In still another embodiment, the content enhancement service may rely on a list of characteristics of the enhancement objects identified in the base item of content. This list may be generated by, for example, one or more experts associated with the content enhancement service or by user input; or a list may be obtained from, for example, a network content library, network-based knowledge base, or network-based encyclopedia.

Referring again to FIG. 3, in block 306, the content enhancement service may identify characteristics of the base item of content itself. Characteristics of the base item of content may include, for example, a genre of the base item of content; a mood of the portion of the base item of content; a geographical setting of the portion of the base item of content; a historical setting of the portion of the base item of content; and a time of day of the portion of the base item of content. Characteristics of the base item of content may also include information on items of content related to the base item of content, e.g. items of content available in other media that may be used as enhancement content with the base item of content. For example, for a base item of content that includes an electronic book of a particular title, related items of content in other media may include an audiobook of the same title and a movie of the same title. Clips of the audiobook or the movie could be used as items of enhancement content.

In some embodiments, the content enhancement service identifies characteristics of a portion of the base item of content by analyzing words present in the content. For example, words, phrases, sentences, images, videos or the like conveyed in the base item of content may indicate characteristics of the portion. For example, words in a portion such as "smile," "laugh," or "celebrate" might prompt the content enhancement service to assign a "cheerful" mood characteristic to that portion, while words such as "sand" and "ocean" might prompt the content enhancement service to assign a "beach" location characteristic to the portion. Words, phrases, sentences, or the like may be associated with images or videos conveyed by the base item of content so that the content enhancement service can identify characteristics of the portion in which those images or videos are conveyed. Further information on the use of machine techniques to identify characteristics of an item of content may be found in U.S. patent application Ser. No. 12/972,058, entitled "GRAPHICALLY REPRESENTING ASSOCIATIONS BETWEEN REFERENTS AND STORIES," filed on Dec. 17, 2010; and in U.S. patent application Ser. No. 12/881,021, entitled "SYSTEMS AND METHODS FOR ASSOCIATING STORIES WITH RELATED REFERENTS," filed on Sep. 13, 2010. The disclosures of both of these applications have been incorporated by reference above.

In other embodiments, the content enhancement service may rely on input from a human interaction task system 108 to identify one or more characteristics of a portion of a base item of content. For example, the human interaction task system 108 may convey a portion of the base item of content to a human worker along with a query such as "In what location or time period is this portion set?" or "What is the mood of this portion?" In still other embodiments, the content enhancement service may obtain information about the base item of content from a network resource such as a network-based encyclopedia or knowledge base. For example, a network-based encyclopedia may maintain summaries of one or more portions of a base item of content that may be accessed by the content enhancement service.

In block 308, the content enhancement service may access enhancement content fitting the characteristics of the portion of the base item of content and/or matching an enhancement object present in the portion of the base item of content. The enhancement content may be accessed remotely over the network 106 (e.g., the user computing device 102 may access remote content from the network content library 104 or the content data store 114, or the content enhancement server 110 may access an item of enhancement content from the network content library 104 and store it in the content data store 114). In embodiments where items of enhancement content are accessed remotely by a computing device, the items of enhancement content may be transmitted by streaming, by torrent, or by any other network data transfer technique or protocol known in the art. The enhancement content may also be accessed locally from an electronic data store associated with a computing device (e.g., by the user computing device 102 locally accessing the user content library 112 or by the content enhancement server 110 locally accessing the content data store 114). In some embodiments, all of the items of enhancement content for use with a base item of content are organized into a content pack and transmitted to or accessed by a user computing device 102.

In some embodiments, items of enhancement content may have characteristics, which may include, for example, the type of enhancement content; the mood of the enhancement content; the duration of the enhancement content; an enhancement object to which the item of enhancement content corresponds, and so forth. Generally, an item of enhancement content may have characteristics of the sort that may also be associated with portions of a base item of content. For example, an item of enhancement content may be a sound file corresponding to a raven's cry. The sound file might be marked to indicate that it corresponds to a sound object such as a "raven" or "bird," and that it might have characteristics such as "horror" or "fear," as ravens often appear in items of content of the horror genre. If an item of enhancement content matches one, some, or all of the characteristics of the portion of the base item of content, and/or includes a sound or image associated with the object identified in the portion of the base item of content, it may be selected as an item of enhancement content for use with the portion of the base item of content.

These characteristic or object matches need not be exact or verbatim matches. As discussed above, the content enhancement service may have access to one or more rules or graphs stored in an electronic data store to guide the selection of enhancement content. Generally described, rules or graphs may be used to translate characteristics or enhancement objects of a base item of content into characteristics likely to be present in or enhancement objects likely to correspond to items of enhancement content. For example, a portion of the base item of content may be set in a kitchen, which can be a location characteristic. A rule or graph stored in an electronic data store associated with the content enhancement service (e.g., stored on user content library 112, network content library 104, or content data store 114) may indicate the characteristic "kitchen" is related in a graph to a number of items of enhancement content, such as the sound of bacon sizzling or a toaster popping. In another example, a portion of a base item of content may have a sad mood. A rule that might be associated with sad moods might be, "Pick only songs with slow tempos and in minor keys to accompany this portion," as slow songs with minor keys are typically associated with sadness.

In block 310, items of enhancement content may optionally be prioritized for a particular portion of the base item of content. In some embodiments, the content enhancement service sets a cap or quota on the number of items of enhancement content to be conveyed with the portion of the base item of content, for example, so as not to overwhelm the user or distract the user from the base item of content. Because a limited number of items of enhancement content may be conveyed with a portion of a base item of content, it may be desirable to prioritize relatively more important characteristics of the portion of the base item of content or enhancement objects in the portion, and to select items of enhancement content accordingly. Thus, in one embodiment, only a subset of the characteristics of a portion of base item of content (or a subset of the characteristics of an item of enhancement content) are used to select an item of enhancement content. Ways to prioritize characteristics of a base item of content are discussed below with respect to FIG. 5. In another embodiment, only enhancement objects are used to select one or more items of enhancement content, and the characteristics of the portion of the base item of content are not used to guide the selection of any enhancement content. In yet a further embodiment, multiple enhancement objects in a portion of the base item of content may be prioritized. For example, the content enhancement service may use only the first enhancement object in a portion of the base item of content to select an item of enhancement content, and may ignore subsequent enhancement objects in the portion. Still other ways of prioritizing enhancement objects and characteristics present in a portion of the base item of content are possible.

The cap or quota may vary based on the type of the item of base content and the type(s) of any items of enhancement content that may be selected. For example, a cap or quota for a page of an electronic book might be one or two sounds and a song, and no other items of enhancement content. Accordingly, if items of enhancement content including an image, a video clip, five sounds, and two songs fit the characteristics or enhancement objects present in the page of the electronic book, the content enhancement service may select only two of the five sounds and one of the two songs to be conveyed, and ignore the remaining items of enhancement content. Additionally, in some embodiments, the cap or quota for a type of enhancement content is zero. For example, the cap or quota for items of video enhancement content may be zero for a television program base item of content, because it may not be desirable or practical to convey a video clip while a television program is conveyed. In other embodiments, the cap or quota is based not on a number of items of enhancement content, but rather the size of an item of enhancement content (e.g., duration or bytes).

In block 312, the content enhancement service may align the selected items of enhancement content with the portions of the base item of content to be enhanced. For example, the content enhancement service may map each item of enhancement content accessed (or designated to be accessed by streaming) by the user computing device 102 or the content enhancement server 110 to one or more portions of a base item of content. These mappings may be collected into an enhancement settings content file, which may be shared over the network 106 with other user computing devices 102 or with the content enhancement server 110. The content enhancement service may also convey the mapped items of enhancement content in block 314, e.g., by causing the user computing device 102 to convey the mapped item of enhancement content.

For base items of content that are conveyed continuously (e.g., audiobooks, videos, television programs, etc.), items of enhancement content may be mapped to timestamps of the base item of content and conveyed when the conveying computing device (such as the user computing device 102) reaches that timestamp in the base item of content.

In other embodiments, however, base items of content are conveyed in discrete portions (e.g., electronic books). Accordingly, the content enhancement service may not be able to rely on timestamps as may be present in continuously conveyed items of content. The content enhancement service may estimate a speed of the user's consumption of the base item of content, for example, by determining how many words the user can read in an electronic book per unit time. The user's reading speed may be determined by, for example, how quickly a user turns the pages of an electronic book. In embodiments in which the user computing device 102 includes a touchscreen, the user's reading speed may be determined by, for example, how quickly a user's finger or stylus passes over the words of the electronic book. The content enhancement service may be able to estimate the time at which a user may reach an enhancement object by determining the distance, in words or pages, a user is from reaching an enhancement object, and dividing that distance by the calculated reader speed. For example, the content enhancement service may determine that a reader reads at approximately 200 words per minute (wpm). A user computing device 102 may convey a page of an electronic book that contains 100 words, with an enhancement object 50 words down the page. Accordingly, when the user turns to the page containing the enhancement object, the content enhancement service may direct the user computing device 102 to convey an item of enhancement content associated with the enhancement object 15 seconds after the user turns to that page (200 words/50 wpm=¼minute, or 15 seconds). The content enhancement service may also include a delay (e.g., a delay of a fixed time, such as five seconds, or a delay factor; such as increasing the estimated time by 10%-100% or by some other factor) so that enhancement content is not conveyed before a user of a user computing device 102 reaches it in the portion of the base item of content. This delay may be advantageously incorporated so as not to startle or confuse a user by conveying an item of enhancement content early.

The content enhancement service may also (or instead) align items of enhancement content with the discrete portions themselves. For example, pages 5-10 of an electronic book might be set during a sunny day, while pages 11-20 might be set during a thunderstorm, with page 16 containing an enhancement object such as a lightning bolt. Accordingly, enhancement content corresponding to a sunny day (e.g., the sound of birds singing or an image of a sunny day) might be conveyed while any one of pages 5-10 is conveyed by the user computing device 102. While the user computing device 102 conveys any one of pages 11-20, however, enhancement content pertaining to a thunderstorm, such as the sound of high winds or heavy rain, may be conveyed instead. Additionally, when the user computing device conveys page 16, enhancement content corresponding to the lightning bolt enhancement object, such as an image of a lightning bolt or the sound of thunder, may also be conveyed.

In some instances, an item of enhancement content may be conveyed in its entirety before the user finishes the portion of the base item of enhancement content to which the item of enhancement content is assigned. For example, the user may be reading a sad portion of an electronic book to which a sad four-minute song is mapped. It may take the user ten minutes to read the sad portion of the electronic book. In one embodiment, the item of enhancement content is only conveyed one time while the portion of the base item of content to which the enhancement content is mapped is conveyed. In another embodiment, the item of enhancement content may be repeated while the portion of the base item of content to which the enhancement content is mapped is conveyed. In still a further embodiment, the content enhancement service may select, access, and convey a second item of enhancement content after the first item of enhancement content has been conveyed. This second item of enhancement content may be automatically selected as described above with respect to block 308.

As discussed above, in some embodiments, one or more of the items of enhancement content may be organized (by a user or by the content enhancement service) into an enhancement content pack that provides enhancement content for one or more portions of a base item of content. The enhancement content pack may be a single file or package of files that includes one or more items of enhancement content that are conveyed when the portion of the base item of content to which they are mapped is conveyed. An enhancement content pack may include enhancement content for every portion of the base item of content, or for fewer than all of the base items of content. An enhancement content pack may be a companion to the base item of content and synchronized to the base item of content, as discussed in U.S. patent application Ser. No. 13/070,313, filed on Mar. 23, 2011 and titled "SYNCHRONIZING DIGITAL CONTENT," the disclosure of which is hereby incorporated by reference in its entirety.

Those skilled in the art will recognize that in some embodiments, enhancement content is only conveyed by a user computing device 102 when the user interacts with a user interface on the user computing device. For example, a user interface may display a portion of a base item of content, such as text, images, or the like. When the user interacts with the user interface (e.g., by tapping a word or image that is an enhancement object in a portion of an electronic book displayed by the user interface), the enhancement content may be conveyed.

Those skilled in the art will also appreciate that the above-described illustrative routine 300 may be carried out substantially while the base item of content is conveyed, e.g., in real time. For example, while a first portion of the base item of content is conveyed, a second portion immediately after the first portion may be analyzed by the content enhancement service for characteristics and enhancement objects. In another example, a portion of the base item may be analyzed for characteristics and enhancement objects while it is being conveyed by the user computing device 102. Enhancement content may be selected substantially while the portion of the base item of content is being conveyed as well. Accordingly, enhancement content may be selected dynamically without the user or the content enhancement service needing to select and map enhancement content in advance.

Figure 4:
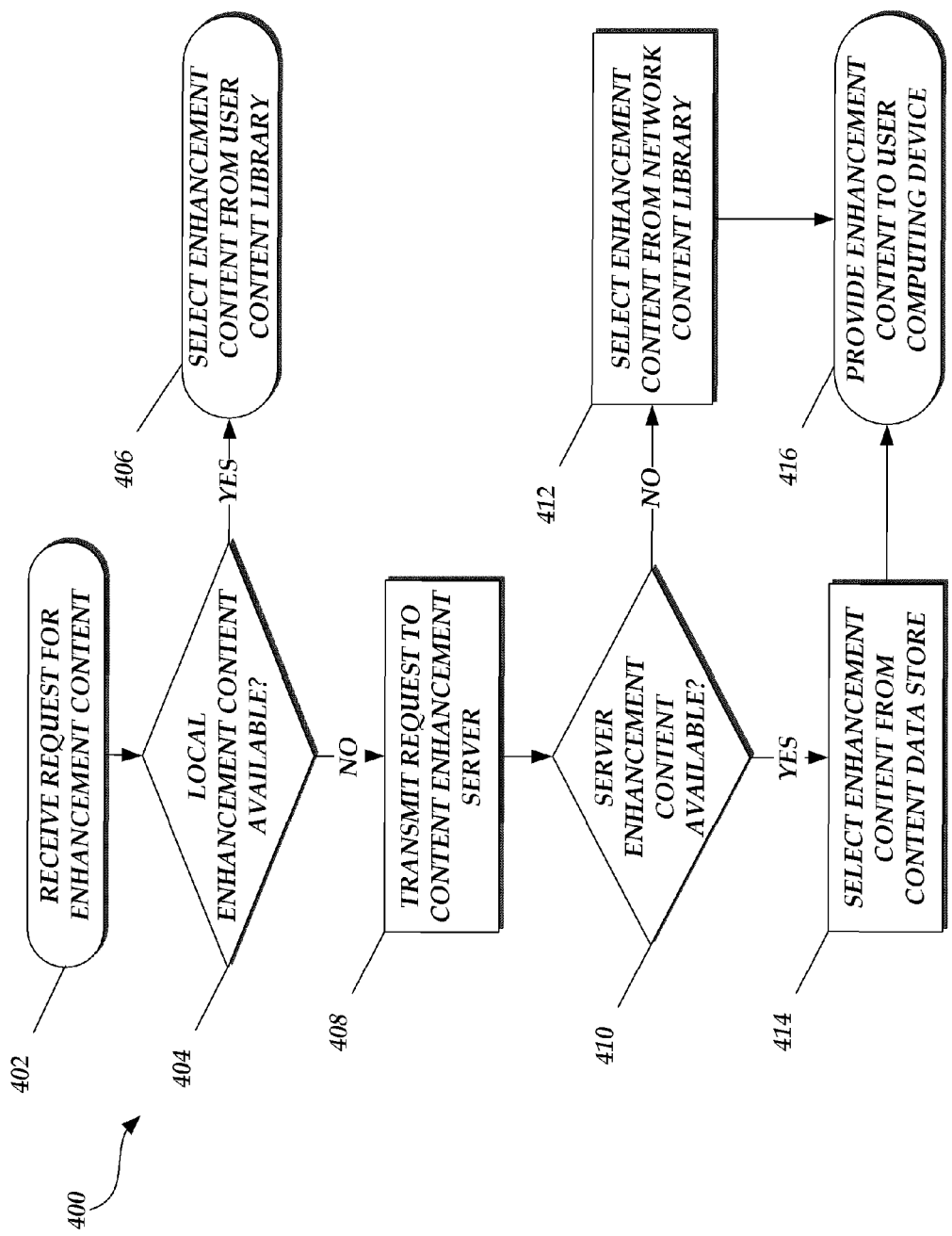
FIG. 4 is a flow diagram depicting an illustrative routine for obtaining enhancement content.

FIG. 4 depicts an illustrative routine 400 by which the content enhancement service may provide items of enhancement content to a user computing device 102. In block 402, the content enhancement service may receive a user request for enhancement content. For example, by interacting through a user interface with his or her user computing device 102, a user may indicate that he or she wishes to obtain enhancement content for use with a base item of content. For example, in embodiments in which the content enhancement service is partially or wholly embodied on user computing device 102, the content enhancement service may generate one or more user interfaces through which the user indicates that he or she wishes to obtain one or more items of enhancement content. In other embodiments, the content enhancement service presents one or more user interfaces for requesting enhancement content as part of a content page accessed through a network browser run by the user computing device 102.

Upon receiving a request for enhancement content, the content enhancement service may determine whether appropriate local enhancement content (e.g., enhancement content corresponding to characteristics or an enhancement object present in a portion of a base item of content) is available locally in block 404. For example, local enhancement content for a user computing device 102 may be stored in user content library 112.

If the content enhancement service determines that appropriate enhancement content is locally available, in block 406, an item of enhancement content may be selected from the user content library 112 local to the user computing device 102. However, if no appropriate enhancement content is locally available or if insufficient appropriate enhancement content is locally available, the user's request for enhancement content may be transmitted over a network to the content enhancement server 110 in block 408.

In block 410, the content enhancement service may determine whether appropriate enhancement content is available through the content enhancement server 110, for example, whether appropriate enhancement content is stored in content data store 114. If there is no appropriate enhancement content available in the content data store 114, the content enhancement service may proceed to block 412 and attempt to obtain enhancement content from a network content library 104.

As discussed above with respect to FIG. 1, the network content library 104 may host or store one or more items of enhancement content in an electronic data store. In some embodiments, these items of enhancement content are labeled with one or more characteristics by the network content library 104, such that their characteristics may be compared or matched to those of the portion of the base item of content for which the user has requested enhancement content. In other embodiments, the content enhancement service determines the characteristics of items of enhancement content stored on the network content library 104 if any of those items have characteristics that would match the portion of the base item of content for which the user has requested enhancement content, a sound object appearing in a portion of the base item of content for which the user has requested enhancement content, or both. As discussed above, characteristics of items of enhancement content may be associated with certain characteristics of portions of base content, e.g., slow songs in minor keys may be associated with a sad characteristic, while happy songs in major keys may be associated with a happy characteristic. If an appropriate item of enhancement content is present in the network content library 104, the content enhancement server 110 may access or obtain the appropriate item of enhancement content and provide that item of enhancement content to the user computing device in block 416, for example by transmitting it over the network. Optionally, the content enhancement server 110 may store, in content data store 114, the item of enhancement content obtained from the network content library 104.

In some instances, however, the content data store 114 associated with the content enhancement server 110 may store an appropriate item of enhancement content. If that is the case, the content custom enhancement service may proceed from block 410 to block 414 to select the appropriate item of enhancement content. The selected appropriate item of enhancement content may then be provided to the user computing device 102 from the content data store 114, as shown in block 416.

Those skilled in the art will appreciate that items of enhancement content from more than one source may be supplied for or assigned to the same portion of a base item of content. In one example, a song to be played while the base item of content is conveyed on the user computing device 102 is streamed from the network content library 104, while one or more sounds corresponding to sound objects present in the portion of the base item of content are played from the user content library 112. In another example, a user computing device 102 may play one or more songs stored in the user content library 112 while conveying the base item of content, and obtain and play sounds corresponding to the sound objects in the base item of content from a network content library 104 or from a content data store 114 associated with the content enhancement server 110.

Those skilled in the art will also appreciate that in embodiments where enhancement content is obtained from a network content library 104, from a content data store 114, or from any other source remote from the user computing device 102, the enhancement content may not be transmitted to the user computing device 102 until it is to be conveyed by the user computing device 102. This approach may be particularly advantageous for user computing devices 102 with limited data storage capacities. For example, an electronic book may include a reference to an opera sound object. When the user computing device 102 conveys the portion of the electronic book in which the opera sound object appears (e.g., the page, chapter, or other portion in which the word "opera" appears or is implied), the content enhancement service may cause the user computing device 102 to download or stream an opera sound item of enhancement content from, for example, network content library 104 or content enhancement server 110. In other embodiments, enhancement content from remote sources may be obtained by the user computing device 102 before the user computing device conveys a base item of content, e.g., by pre-downloading items of enhancement content from remote electronic data stores and storing them to user content library 112.

Those skilled in the art will recognize that a routine similar to routine 400 may be followed by the content enhancement server 110 to obtain items of enhancement content. For example, the content enhancement server 110 may have a base item of content stored in a content data library 114 that is locally accessible to the content enhancement server. The content enhancement server 110 may determine whether appropriate enhancement content for the base item of content is present in the content data store 114. If no appropriate enhancement content is present in the content data store 114, the content enhancement server may query a remote network content library 104 or even a remote user computing device 102 to determine whether either has an appropriate item of enhancement content stored in an electronic data store. If so, the content enhancement server 110 may request the item of enhancement content, and, if granted permission to access the item of enhancement content, may obtain the item (e.g., by downloading it over network 106) and store it to content data store 114.

Figure 5:
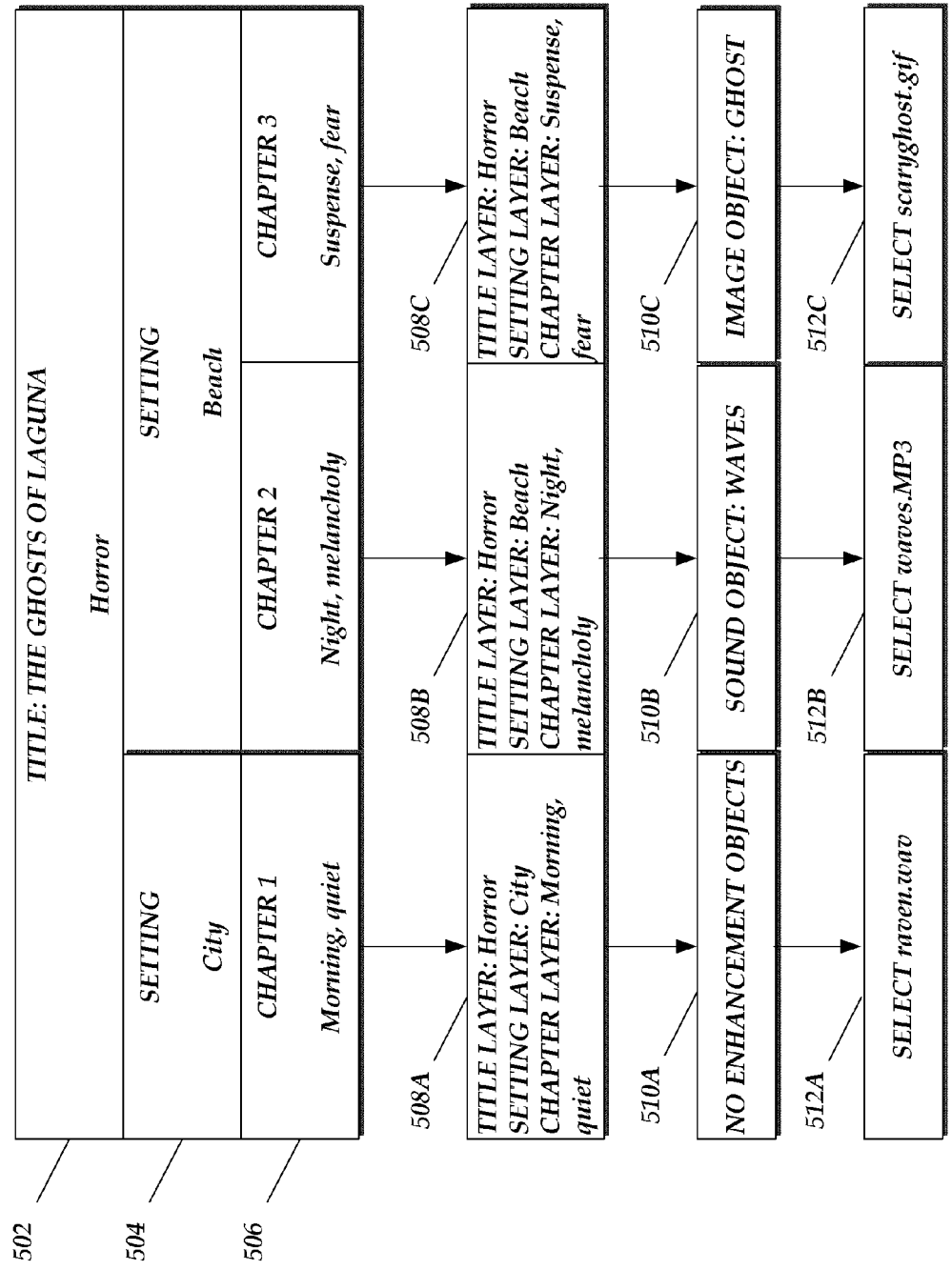
FIG. 5 is a schematic diagram depicting characteristics of portions of an illustrative base item of content.

FIG. 5 depicts a schematic diagram depicting multiple layers of information relating to multiple portions of a base item of content. Generally described, a layer of a base item of content may include or "cover" one or more portions of the base item of content that have certain aspects in common, such as a common location, setting, mood, time etc. These portions may be contiguous or discontiguous. Each layer of a base item of content may contribute characteristics to a portion of the base item of content covered by that layer. Characteristics present in each layer may be identified by the content enhancement service in a variety of ways, such as through the use of a human interaction task system, computerized content analysis techniques, or information about an item of content obtained from a network resource such as a network-based encyclopedia or knowledge base. These techniques and others may be similar to the ways to identify characteristics described above with respect to block 306 in FIG. 3.

The title layer 502 may include information about characteristics that are global to the entire base item of content, e.g., to all portions of the base item of content. Characteristics that may be imparted by the title layer 502 to portions of the base item of content may include, for example, characteristics associated with the genre of the base item of content (e.g., horror, comedy, tragedy, etc.) or a mood global to the entire base item of content. For example, the Shakespeare play Hamlet is a play of the tragedy genre, and has a gloomy mood reflected even in the scenes of comic relief. All portions of Hamlet may accordingly be assigned characteristics such as "tragedy" or "gloomy."

The unity layer 504 may also impart one or more characteristics to a portion of an item of content. Generally described, a unity (also known as a dramatic unity or Aristotelian unity) may be a location, historical era, event, or character common to multiple portions of a base item of content. The unity layer 504 may thus impart characteristics to multiple portions of a base item of content that share a unity. For example, the unity layer 504 in FIG. 5 shows an example type of unity: geographical settings. Chapter 1 takes place in a city, and is thus covered by the portion of the unity layer 504 pertaining to a city setting. Chapter 2 and Chapter 3, on the other hand, both take place on a beach, and are thus covered by the portion of the unity layer 504 pertaining to a beach setting. Any portion of the unity layer 504 may include multiple unities: for example, two or more portions of a base item of content may take place in the same or different locations during the same historical era. For example, some portions of Shakespeare's Henry V took place in England during the Hundred Years' War, while other portions took place in France during the Hundred Years' War.

The portion layer 506 may indicate the characteristics specific to one or more portions of the base item of content. While the portions shown in FIG. 5 are chapters, as in an electronic book or audiobook, other portions may be used as desired. For example, the portions may be episodes; acts or scenes in a play in audiobook or electronic book form; pages of an electronic book; spoken or textual paragraphs; time increments for continuously conveyed content (e.g., audio content or video content), etc. Other ways to divide a base item of content into portions are possible and within the scope of this disclosure. Characteristics that may be imparted by the portion layer 506 include the time of day of the portion; the mood of the portion; any plot characteristics of the portion (e.g. whether the plot is about to resolve, is in the process of resolving, or has already resolved); which characters may be present in the portion, etc.

The characteristics imparted to a portion of a base item of content by each layer may be combined to determine a full set of characteristics for the portion of the base item of content, as shown in portions 508A-C. For example, portion 508A has a horror (genre) characteristic from the title layer 502, a city (location) characteristic from unity layer 504, and a morning (time of day) characteristic from portion layer 506. Portion 508B has a horror (genre) characteristic from the title layer

502, a beach (location) characteristic from unity layer 504, and night (time of day) and melancholy (mood) characteristics from portion layer 506. Portion 508C has a horror (genre) characteristic from the title layer 502, a beach (location) characteristic from unity layer 504, and has suspense (mood) and fear (mood) characteristics from portion layer 506.

A portion may include enhancement objects, shown in FIG. 5 as object blocks 510A-C. The set of characteristics for a portion may be used in conjunction with any enhancement objects present in the portion of the base item of content to select items of enhancement content to accompany the portion in enhancement blocks 512A-512C. Items of enhancement content may be chosen for a portion of the base item of content based on characteristics of the portion; enhancement objects present in the portion; or both, as discussed above with respect to FIG. 3.

If no enhancement objects are present, the content enhancement service may, using one, some, or all of the known characteristics of the portion of the base item of content, select enhancement content based on the known characteristics. For example, as shown in the object block 510A, no enhancement object is present in the portion 508A. However, the portion 508A has a number of characteristics affiliated with it: horror, city, and morning. Based on these characteristics, the content enhancement service may, using one or more content rules or graphs stored in a data store associated with the content enhancement service, select a crow sound in the selection block 512A to reflect these characteristics, as crows are common in horror themes and the sound of birds chirping is common in the morning.

If an enhancement object is present in the portion of the base item of content, the enhancement object may be used to guide the selection of an item of enhancement content. In some embodiments, only the enhancement object is used to guide the selection of an item of enhancement content, and characteristics are not considered. For example, the portion 508B includes in the object block 510B a sound object corresponding to waves. The portion 508B also includes affiliated characteristics: horror, beach, night, and melancholy. The sound of waves may not need to be varied based on the genre, mood, location, or time of day when the waves occur. Accordingly, an item of enhancement content corresponding to the sound of waves may be selected in selection block 512B without necessarily considering the characteristics of the portion 508B.

In some instances, both the characteristics of the portion of the base item of content and the enhancement object are used to guide the selection of an item of enhancement content. For example, the portion 508C has characteristics corresponding to horror, beach, suspense, and fear. The portion 508C also contains an image object corresponding to a ghost in block 510C. An electronic data store containing multiple items of enhancement content may include, for example, multiple images of ghosts. Some images of the ghosts may be better suited to fearful portions of horror-themed content than other images (e.g., an image of a scary ghost as opposed to an image of a friendly ghost or a child dressed as a ghost for Halloween). Accordingly, both the characteristics of the portion 508C (horror, fear) and the image object 510C (a ghost) may be used to select, in selection block 512C, an image of a scary ghost.

Any number of layers containing any number of characteristics may be used, and layers need not specifically align with whole portions of the base item of content. For example, a unity layer may cover part of Chapter 2 and part of Chapter 3, but may not cover either portion entirely. Other layers than those depicted may be used as well. For example, layers higher than the title layer 502 might include a series-level layer (e.g., for a base item of content that is part of a series of base items of content) or an author-level layer (e.g., covering all base items of content written by a particular author). Additionally, the types of characteristics in one layer need not be mutually exclusive with the types of characteristics present another layer. For example, as discussed above, the unity layer 504 may include information about the location of one or more portions of the base item of content. However, information about the location of one or more portions of the base item of content may also be present in the portion layer 506 or the title layer 502.

In some embodiments, layers can take priority over one another, such that the characteristics of one or more layers are used to select an item of enhancement content while the characteristics of one or more other layers are not used. In one embodiment, a higher layer (e.g., a title layer) takes priority over all lower layers (e.g., a unity layer or portion layer). For example, returning to the above example of Hamlet, the title layer of Hamlet may impart characteristics such as "tragedy" or "gloomy" to all portions of the Hamlet base item of content. These prioritized characteristics may be used to select items of enhancement content to the exclusion of characteristics present in lower layers. For example, the "tragedy" and "gloomy" characteristics may displace a "humorous" characteristic present at the "Alas, poor Yorick" comic relief portion layer in Hamlet, such that only tragic, gloomy items of enhancement content are selected to be conveyed with the portion of the base item of content containing the comic relief scene. In another embodiment, lower layers (e.g., a portion layer) may take priority over higher layers (e.g., a title layer). Returning to the example of Hamlet, the prioritized "humorous" characteristic of the comic relief portion layer may displace the "tragedy" and "gloomy" characteristics present in the title layer. Accordingly, only humorous items of enhancement content may be selected to be conveyed with the portion of the base item of content containing the comic relief scene, with the "tragedy" and "gloomy" characteristics not taken into consideration. Still other ways of prioritizing characteristics from layers are possible.

Figure 6:
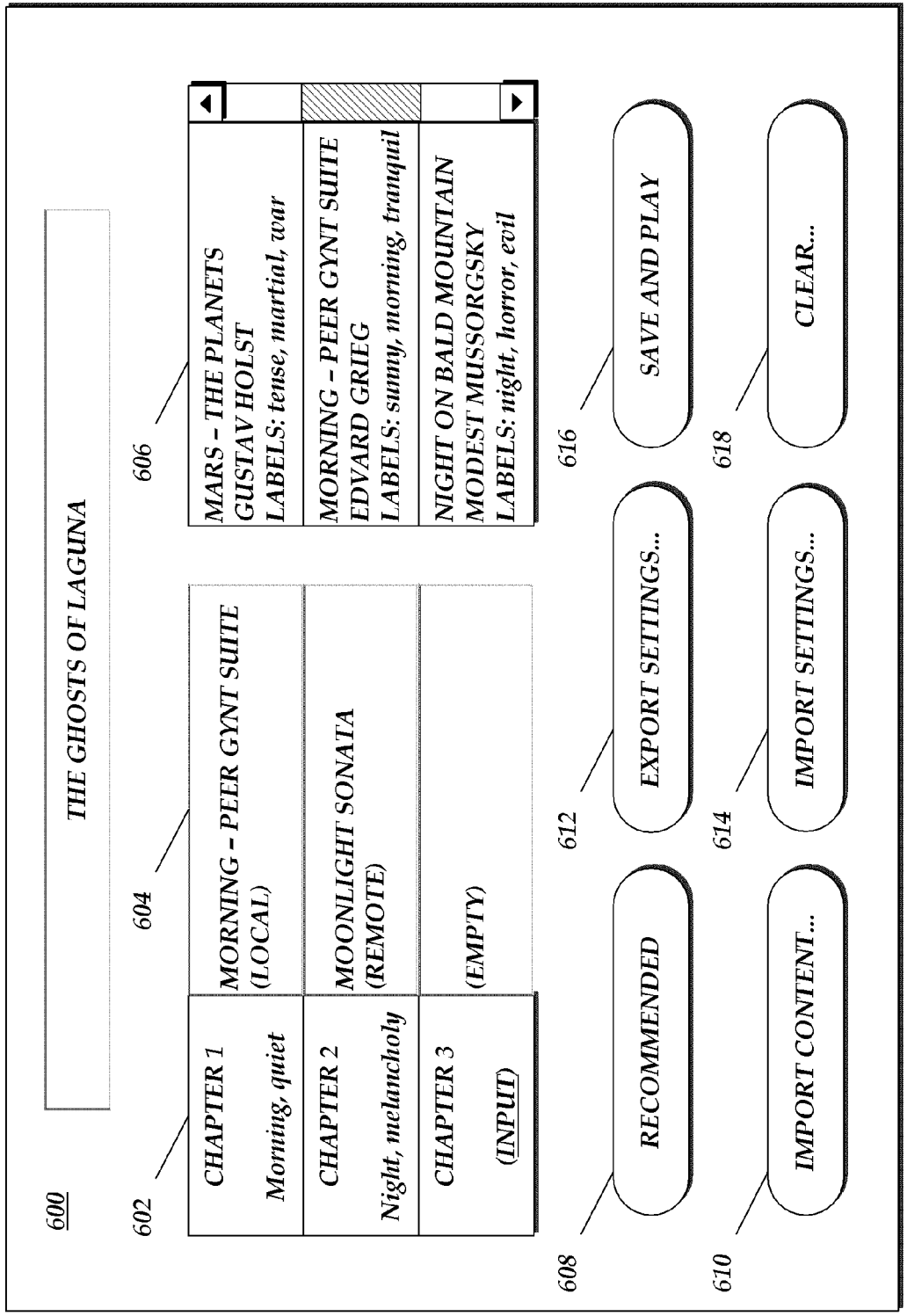
FIG. 6 is a pictorial diagram depicting an illustrative user interface for assigning items of enhancement content to portions of an item of content.

FIG. 6 depicts an illustrative user interface 600 by which a user may select items of enhancement content for one or more portions of a base item of content. The user interface may include one or more portion slots 602. While the illustrated user interface 600 includes portion slots 602 that each correspond to a chapter of the base item of content, other portion slots may be used as desired. As discussed above with respect to FIG. 5, a base item of content may be broken down into time increments, pages, paragraphs, lines, episodes, scenes, acts, etc. These portions may be the same size or of different sizes. Each portion slot 602 may indicate characteristics of the portion of the base item of content. In this example, Chapter 1 corresponds to a portion of the item of content whose characteristics are morning and quiet, while Chapter 2 corresponds to a portion of the base item of content that occurs at night and is melancholy. The portion slots 602 may also provide a user the opportunity to input or edit characteristics assigned that portion, as seen with respect to the chapter slot for Chapter 3. In some embodiments, the portion slots 602 also include a partial or complete list of any enhancement objects present in the portion.

Each portion slot 602 may be associated with an enhancement content slot 604. The enhancement content in each enhancement content slot 604 may be conveyed to a user while the user computing device 102 conveys a portion of the base item of content with which the enhancement content slot 604 is affiliated, as discussed above. For example, the content enhancement service may cause the user computing device 102 to convey "Morning" from the Peer Gynt Suite while the user computing device 102 also conveys Chapter 1 of the base item of content. Likewise, while the user computing device 102 conveys Chapter 2, the content enhancement service may cause "Moonlight Sonata" to be conveyed to the user. If a content enhancement slot 604 is empty, it may be indicated as such in the user interface 600. Content enhancement slot 604 may also indicate the origin of each item of enhancement content assigned to each portion of the base item of content. For example, "Morning" from the Peer Gynt Suite may be indicated as being a local item of enhancement content—that is, an item of enhancement content that may be stored on a data store locally accessible to the user computing device 102, such as user content library 112. Alternately, if the enhancement content is to be transmitted to the user computing device 102 from a remote source, such as from content enhancement server 110 or network content library 104, the enhancement content slot 604 may indicate that the item of enhancement content originates from a remote source. In this way, users of the content enhancement service may be notified that if no connection over network 106 is available to user computing device 102, they may not have access to an item of remote enhancement content (e.g., a user may not be able to stream an item of enhancement content to his or her user computing device 102).

The user interface 600 may also include an enhancement content menu 606. The enhancement content menu 606 may list one or more items of enhancement content as well as characteristics about each item of enhancement content or any enhancement objects to which an item of enhancement content may correspond. For example, for an item of enhancement content that is a song, the name of the song, the composer or artist of the song, the duration of the song, the genre of the song, any characteristics of the song may be displayed in the enhancement content menu. These characteristics may have been previously assigned to the item of enhancement content, or may be identified by the content enhancement service as discussed above with respect to block 306 in FIG. 3. These characteristics may assist users in assigning items of enhancement content to portions of the base item of content. Users may interact with the enhancement content menu 606 to assign items of enhancement content to one or more portion slots 604 by, for example, clicking or tapping and dragging the menu entry for an item of enhancement content from the menu 606 to an enhancement content slot 604.

In some embodiments, the enhancement content menu 606 includes all items of enhancement content that could be made available to the user computing device by the content enhancement service. For example, the content enhancement menu 606 may include a list of all items of enhancement content stored in the user content library 112, in the content data store 114 associated with the content enhancement server 110, and any available items of enhancement content that may be stored on the network content library 104, as shown in FIG. 1. In other embodiments, the only items of enhancement content shown in enhancement content menu 606 are those stored in the user content library 112.

In addition to manually assigning items of enhancement content to each portion of the base item of content, the user may interact with recommended button 608 to assign automatically one or more items of enhancement content to each portion of the base item of content. For example, a content enhancement service may compare the characteristics of a portion of the base item of content to the characteristics of one or more items of enhancement content. The item of enhancement content may be assigned to the portion of the base item of content if the characteristics of the portion of the base item of content and the item of enhancement content are an exact or close match. Items of enhancement content matching enhancement objects in the portion of the base item of content may also be assigned automatically to the portion.

In some embodiments, a user's interaction with the recommended button 608 prompts the content enhancement service to assign enhancement content to one or more portions of the base item of content based on recommendations stored by the content enhancement service, for example, on content enhancement server 110. The user may optionally modify these assignments of enhancement content. For example, the author or publisher of the base item of content may have a particular set of items of enhancement content in mind that should be conveyed along with the base item of content. Alternately, the content enhancement service may determine recommendations based on how frequently an item of enhancement content is assigned to a particular portion of an item of content by users of the content enhancement service. If an item of enhancement content is assigned to a portion of base content particularly frequently, the content enhancement service may recommend using that item of enhancement content with the portion of the base item of content. The content enhancement server 110 may also maintain or access a social graph affiliated with a user of the user computing device 102 to determine and recommend which items of enhancement content are being selected by persons in the user's social graph.

In other embodiments, interacting with the recommended button 608 causes the user computing device 102 to transmit a request to the content enhancement service for an enhancement content settings file specifying one or more items of enhancement content for each portion of the base item of content, or for an enhancement content pack. The content enhancement server 110 may maintain, for example, popularity ratings, star ratings, or download counts of a particular enhancement content settings file or enhancement content pack. The content enhancement server 110 may also maintain or access a social graph affiliated with a user of the user computing device 102 to determine and recommend which enhancement content settings files or enhancement content packs have been accessed by persons in the user's social graph.

The recommendations made by the content enhancement service may be modified by user feedback. For example, the content enhancement service may receive an indication from a user that the user did not enjoy a particular item of enhancement content. Accordingly, that item of enhancement content may not be recommended to the user for use with subsequently-conveyed base items of content or portions of a base item of content. The user may also specify which types of items of enhancement content he or she prefers to be conveyed. For example, the user may prefer songs to sounds. Accordingly, the content enhancement service may recommend songs instead of sounds for portions of a base item of content. Other ways for obtaining and applying user feedback to recommendations for items of enhancement content are possible.

In some instances, the enhancement content menu 606 may not contain an item of enhancement content desired by the user to be conveyed while the portion of the base item of content is conveyed. Accordingly, when a user interacts with import button 610, the user computing device 102 may obtain an item of enhancement content and optionally store it to the user content library 112. For example, the user computing device may obtain an item of enhancement content from the network content library 104 or from a content data store 114 associated with the content enhancement server 110.

Those skilled in the art will appreciate that in some embodiments, an imported item of enhancement content is not stored with the user computing device 102. Rather, the import button 610 may be used to obtain a link to an item of enhancement content stored remotely: for example, on the network content library 104 or in the content data store 114 associated with the content enhancement server 110. The user computing device 102 may stream an imported item of enhancement content substantially while conveying the portion of the base item of content on the user computing device 102. An item of enhancement content to be streamed from a remote source may be marked as remote in an enhancement content slot 604, as noted above.

After assigning items of enhancement content to one or more portions of the base item of content, a user may export their settings by interacting with export settings button 612. For example, the settings generated by the user may be collected into an enhancement content settings file, transmitted to the content enhancement server 110, and optionally stored to the content data store 114. The items of enhancement content that the user has assigned to each portion of the base item of content may collected and store as an enhancement content pack, which may be transmitted to another user computing device 102 or to the content enhancement server 110 for optional storage in content data store 114. Settings files and content packs stored on the content enhancement server 110 may then be transmitted by the content enhancement server 110 to another user computing device 102 upon request. For example, a user may generate a request for an enhancement content pack or enhancement content settings file by interacting with import button 614. Alternately, the user may import an enhancement content settings file or enhancement content pack stored or previously generated by the user on his or her user computing device 102.

Once the user has assigned items of enhancement content to portions of the base item of content to his or her content, the user may interact with the save and play button 616. The user's assignments of items of enhancement content may be stored in memory on the user computing device 102, and the base item of content may then be conveyed to the user, along with any items of enhancement content that the user has selected to be conveyed.

If the user is dissatisfied with the assignments of enhancement content to one or more portions of the base item of content, the user may interact with the clear all button 618. If the user interacts with the clear button 618, one or more of the content enhancement slots 604 may be emptied. The user may then assign items of enhancement content to each portion of the base item of content as desired.

It should be appreciated in some embodiments, multiple different types of enhancement content are associated with the same portion of the base item of content. For example, a portion of the base item of content may be associated with a song, with a sound clip, with a video clip and/or with a visual content. A portion of the base item of content may be associated with zero, one, or more than one item of enhancement content. Additionally, the items of enhancement content selected by the user need not match the characteristics of the portion of the base item of content to which the item of enhancement content is assigned.

Those skilled in the art will also appreciate that the user interface 600 may be displayed to a human worker of a human interaction task system 108 in conjunction with one or more queries regarding the base item of content and the items of enhancement content. For example, the human interaction task system 108 may pose a query to the human worker such as, "Please select a song for each chapter of this electronic book," or, "Please identify any enhancement objects that may be present in this portion of the base item of content based upon the following characteristics of the portion." For example, for a portion of a base item of content set on a farm (location characteristic), the human worker might indicate that sound objects, such as cows, chickens, or pigs, may be present. Items of enhancement content may be selected or recommended by the content enhancement service accordingly; for example, an audio clip of a cow mooing or a chicken clucking Human workers of the human interaction task system 108 may also be requested to generate enhancement content settings files or enhancement content packs using the user interface 600.

Figure 7:
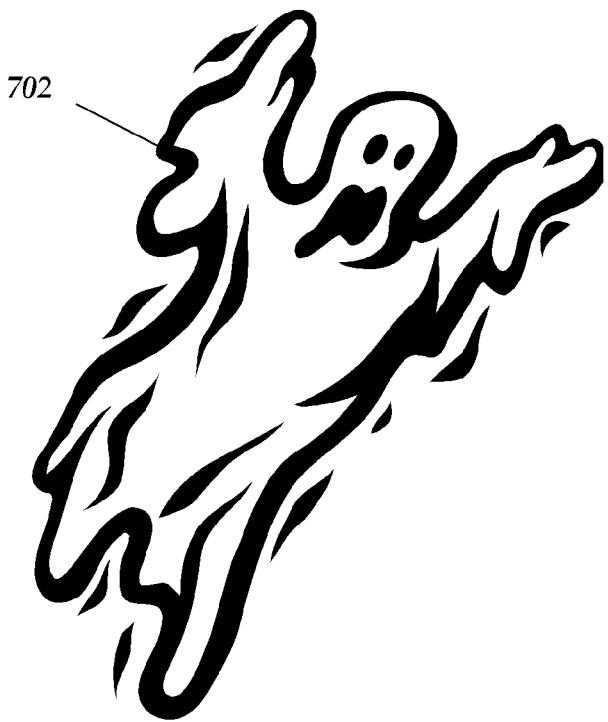
FIG. 7 is a pictorial diagram depicting an illustrative user interface including a portion of an item of content and an item of enhancement content.

FIG. 7 depicts an illustrative user interface 700 through which base items of content and/or items of enhancement content may be conveyed on the user computing device 102. In this user interface, image enhancement content 702 is displayed while a portion of a base item of content 704 is conveyed. Here, the image enhancement content 702, a scary ghost, matches the "ghost" enhancement object 708 present in the portion of the base item of content 704. Additionally, the user may interact with "creaked" enhancement object 706 and/or "ghost" enhancement object 708 (e.g., by tapping a portion of a user computing device 102 touchscreen where the words are displayed) to hear an item of sound enhancement content such as a creaking floorboard for "creaked" enhancement object 706 or a ghostly howl for "ghost" enhancement object 708. The enhancement objects in portion of the base item of content may be marked by, for example, underlining, highlighting, italicizing, or bolding the enhancement objects to encourage users to interact with the marked enhancement object.

By interacting with the enhancement settings button 710, the user may be taken to a user interface such as user interface 600. The user may have the opportunity to add, change, or remove assignments of enhancement content to the base item of content, for example. The user may also be given the opportunity to modify other settings, such as visual settings (e.g. contrast, brightness, gamma, saturation, etc.) or audio settings (e.g. volume, bass, treble, etc.). Interfaces and instrumentalities for adjusting these settings are well known in the art and need not be described in further detail here.

The user may also have the option to toggle whether the user computing device 102 conveys items of enhancement content by interacting with toggle button 712. If enhancement content is disabled, it is not conveyed by the user computing device 102. If enhancement content is enabled, it may be conveyed by the user computing device 102. Toggle button 712 may read "disable enhancement" while enhancement content is enabled, and may read "enable enhancement" while enhancement content is disabled. The user may also have the option of toggling only certain types of enhancement content, e.g., disabling audio content but leaving visual enhancement content enabled.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z" ☐ unless specifically stated otherwise, is otherwise understood with the context as used in general to convey that an item, term, etc. may be either X, Y or Z, or a combination thereof. Thus, such conjunctive language is not generally intended to imply that certain embodiments require at least one of X, at least one of Y, and at least one of Z to each be present.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
    under control of one or more computing devices configured with specific computer-executable instructions,
        determining, based at least in part on a textual representation of a portion of the base item of content, one or more characteristics of the portion of the base item of content;
        identifying a la er of the base item of content that includes the portion, wherein the layer includes both the portion of the base item of content and at least one other portion of the base item of content;
        determining a characteristic of the layer of the base item of content, wherein the portion and the at least one other portion have the characteristic of the layer in common;
        selecting enhancement content based at least in part on the one or more characteristics of the portion of the base item of content and the characteristic of the layer; and
        causing a computing device to present the selected enhancement content during presentation of the portion of the base item of content.

2. The computer-implemented method of claim 1, where the one or more characteristics of the portion of the base item of content include at least one of a genre of the base item of content; a mood of the portion of the base item of content; a location of the portion of the base item of content; a historical setting of the portion of the base item of content; or a time of day of the portion of the base item of content.

3. The computer-implemented method of claim 1, wherein at least one of the one or more characteristics of the portion of the base item of content is a prioritized characteristic.

4. The computer-implemented method of claim 1, wherein the selected enhancement content comprises digital audio content.

5. The computer-implemented method of claim 4 further comprising identifying an object in the portion of the base item of content, wherein the object is associated with a sound, and wherein the digital audio content comprises the sound.

6. The computer-implemented method of claim 4, wherein the digital audio content comprises a song.

7. The computer-implemented method of claim 1, wherein the selected enhancement content comprises digital visual content.

8. The computer-implemented method of claim 7, wherein the digital visual content comprises at least one of digital video content, digital text content, or a digital image.

9. The computer-implemented method of claim 1 further comprising:
    after the selected enhancement content has been presented by the computing device at least once, determining whether the portion of the base item of content continues to be presented by the computing device; and
    if the portion of the base item of content continues to be presented by the computing device,
        selecting additional enhancement content; and
        causing the user computing device to present the additional enhancement content.

10. A non-transitory computer-readable medium storing computer executable instructions that, when executed by one or more computing devices, configure the one or more computing devices to perform operations comprising:
    identifying an object present in a first portion of digital content, the object comprising at least one of a word or an image in the first portion of digital content;
    determining a characteristic of a larger portion of the digital content, wherein the larger portion includes the first portion of the digital content and at least a second portion of the digital content, wherein the first portion and the second portion have the characteristic of the larger portion in common;
    selecting enhancement content corresponding to the object, wherein the enhancement content is selected based at least in part on the characteristic of the larger portion of the digital content; and
    substantially while a computing device is presenting the first portion of digital content in which the object is present, causing the computing device to present the enhancement content corresponding to the object.

11. The non-transitory computer-readable medium of claim 10, wherein the operations further comprise:
    based on a determination that the enhancement content corresponding to the object is not stored in a local electronic data store, obtaining the enhancement content corresponding to the object from a remote electronic data store; and
    storing, to the local electronic data store, the obtained item of enhancement content corresponding to the object.

12. The non-transitory computer-readable medium of claim 10, wherein:
    the portion of digital content has a characteristic; and
    the obtained enhancement content matches the characteristic of the portion of digital content.

13. The computer-implemented method of claim 6, wherein the song is selected based at least in part on a determination that the song is associated with the one or more characteristics of the portion of the base item of content.

14. The computer-implemented method of claim 13, wherein causing the computing device to present the selected enhancement content comprises causing the computing device to play the song while the computing device presents the portion of the base item of content.

15. The non-transitory computer-readable medium of claim 10, wherein the object is associated with a sound, and wherein the enhancement content comprises the sound.

16. A system comprising:
a data store configured to store a base item of content; and
a computing device in communication with the data store and that is configured to at least:
determine, based at least in part on a textual representation of a first portion of the base item of content, a characteristic of the first portion of the base item of content;
determine a characteristic of a larger portion of the base item of content, wherein the larger portion includes the first portion of the base item of content and at least a second portion of the base item of content, wherein the first portion and the second portion have the characteristic of the larger portion in common;
select enhancement content based at least in part on the characteristic of the first portion of the base item of content and the characteristic of the larger portion of the base item of content, wherein the characteristic of the first portion is different than the characteristic of the larger portion; and
electronically present the selected enhancement content.

17. The system of claim 16, where the characteristic of the first portion of the base item of content includes a mood.

18. The system of claim 16, wherein the characteristic of the first portion of the base item of content is prioritized relative to at least one other characteristic when selecting enhancement content.

19. The system of claim 16, wherein the selected enhancement content comprises digital audio content.

20. The system of claim 16, wherein the computing device is further configured to identify an object in the portion of the base item of content, wherein the object is associated with a sound, and wherein the enhancement content comprises the sound.

21. The system of claim 16, wherein the enhancement content comprises digital visual content.

22. The system of claim 16, wherein the computing device is further configured to present the first portion of the base item of content while the selected enhancement content is presented.

23. The computer-implemented method of claim 1, wherein the layer of the base item of content is one of a title layer, a setting layer or a chapter layer.

24. The computer-implemented method of claim 1, wherein the characteristic of the layer of the base item of content indicates one of a location, setting or mood that is associated with each of a plurality of content portions that are included in the layer.

25. The non-transitory computer-readable medium of claim 10, wherein selecting the enhancement content further comprises:
identifying, in an electronic data store, multiple items of enhancement content that are each associated with the object; and
selecting one of the multiple items based at least in part on the characteristic of the larger portion of the digital content.

26. The system of claim 16, wherein the characteristic of the larger portion is one of a location, setting, mood, time, event, genre or character that the first portion and the second portion have in common.

27. The system of claim 16, wherein the computing device being configured to determine the characteristic of the larger portion comprises the computing device being further configured to:
identify, in a textual representation of the larger portion of the base item of content, a word that has been previously associated with the characteristic of the larger portion.

28. The system of claim 16, wherein the larger portion of the base item of content is one of a chapter, an episode, an act, a scene, a page, or the base item of content as a whole.

29. The system of claim 28, wherein the computing device being configured to determine the characteristic of the larger portion comprises the computing device being further configured to:
retrieve the characteristic of the larger portion from stored data that identifies one or more characteristics associated with the larger portion.

30. The computer-implemented method of claim 1, wherein identifying the layer of the base item of content that includes the portion comprises:
retrieving stored layer information associated with the base item of content, wherein the stored layer information identifies a plurality of layers and one or more portions of the base item of content that are included in each layer of the plurality of layers.

* * * * *

UNITED STATES PATENT AND TRADEMARK OFFICE
CERTIFICATE OF CORRECTION

| | | |
|---|---|---|
| PATENT NO. | : 9,141,257 B1 | Page 1 of 1 |
| APPLICATION NO. | : 13/526330 | |
| DATED | : September 22, 2015 | |
| INVENTOR(S) | : Goldstein et al. | |

It is certified that error appears in the above-identified patent and that said Letters Patent is hereby corrected as shown below:

In the specification

Column 22 line 13, Change "clucking" to --clucking.--.

In the claims

Column 23 line 38, Claim 1, change "la er" to --layer--.

Column 24 line 21, Claim 9, change "the user" to --the--.

Signed and Sealed this
Fifth Day of April, 2016

Michelle K. Lee
*Director of the United States Patent and Trademark Office*